United States Patent
Povirk et al.

(10) Patent No.: US 7,815,026 B2
(45) Date of Patent: *Oct. 19, 2010

(54) TORQUE CONVERTER IMPELLER CLUTCH CONTROL

(75) Inventors: Jacob M. Povirk, Franklin, MI (US); William R. Simpson, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/724,617

(22) Filed: Mar. 15, 2007

(65) Prior Publication Data

US 2008/0227597 A1 Sep. 18, 2008

(51) Int. Cl.
*F16H 45/00* (2006.01)
*F16H 45/02* (2006.01)
(52) U.S. Cl. .................... 192/3.26; 192/3.3; 192/3.33
(58) Field of Classification Search ............ 192/3.21, 192/3.25, 3.26
See application file for complete search history.

(56) References Cited

U.S. PATENT DOCUMENTS

| | | | |
|---|---|---|---|
| 3,537,262 A | 11/1970 | Briski | |
| 3,680,398 A | 8/1972 | Schneider et al. | |
| 3,822,771 A | 7/1974 | Audiffred et al. | |
| 4,153,147 A | 5/1979 | Chana | |
| 4,843,908 A * | 7/1989 | Koshimo | 74/731.1 |
| 5,380,257 A | 1/1995 | Coffman et al. | |
| 5,400,884 A | 3/1995 | Matsuoka | |
| 5,613,581 A | 3/1997 | Fonkalsrud et al. | |
| 6,019,202 A | 2/2000 | Anwar | |
| 6,494,303 B1 * | 12/2002 | Reik et al. | 192/3.29 |
| 6,551,212 B2 | 4/2003 | Skinner et al. | |
| 7,017,722 B2 | 3/2006 | Leber | |
| 7,044,279 B2 | 5/2006 | Leber | |
| 7,644,812 B2 * | 1/2010 | Simpson et al. | 192/3.33 |
| 2004/0188209 A1 * | 9/2004 | Leber | 192/3.25 |
| 2007/0287581 A1 * | 12/2007 | Parks et al. | 477/52 |

FOREIGN PATENT DOCUMENTS

JP    58050352 A  *  3/1983

OTHER PUBLICATIONS

English language translation of JP 58-50352 A.*

* cited by examiner

*Primary Examiner*—Richard M. Lorence
(74) *Attorney, Agent, or Firm*—David B. Kelley; MacMillan, Sobanski & Todd, LLC

(57) ABSTRACT

A system for controlling a torque converter of an automatic transmission driven by a power source, the system including a torque converter an impeller, a turbine driveably connected to a transmission input and able to be driven hydrokinetically by the impeller, a stator, an impeller clutch for alternately engaging and disengaging a drive connection between the impeller and the power source, a source of converter charge pressure communicating with the impeller clutch, a source of converter discharge pressure communicating with the impeller clutch, a magnitude of differential force due to charge pressure and discharge pressure across the impeller clutch alternately producing operating multiple operating states of the impeller clutch, and a orifice having a variable fluid flow area for changing a magnitude of converter discharge pressure.

15 Claims, 2 Drawing Sheets

TORQUE CONVERTER IMPELLER CLUTCH CONTROL

BACKGROUND OF THE INVENTION

1. Field of the Invention

This invention relates generally to a torque converter for an automatic transmission, and, in particular, to control of an impeller clutch among locked released and slipping states.

2. Description of the Prior Art

A torque converter is a modified form of a hydrodynamic fluid coupling, and like a fluid coupling, is used to transfer rotating power from a prime mover, such as an internal combustion engine or electric motor, to a rotating driven load. A torque converter is able to multiply torque when there is a substantial difference between input and output rotational speed, thus providing the equivalent of a reduction gear.

In a torque converter there are at least three rotating elements: the impeller, which is mechanically driven by the prime mover; the turbine, which drives the load; and the stator, which is interposed between the impeller and turbine so that it can alter oil flow returning from the turbine to the impeller. The classic torque converter design dictates that the stator be prevented from rotating under any condition, hence the term stator. In practice, however, the stator is mounted on an overrunning clutch, which prevents the stator from counter-rotating the prime mover but allows for forward rotation.

Pumping losses within the torque converter reduce efficiency and generate waste heat. In modern automotive applications, this problem is commonly avoided by use of a lock-up clutch, which physically links the impeller and turbine, effectively changing the converter into a purely mechanical coupling. The result is no slippage, and therefore virtually no power loss and improved fuel economy.

While torque multiplication increases the torque delivered to the turbine output shaft, it also increases the slippage within the converter, raising the temperature of the fluid and reducing overall efficiency. For this reason, the characteristics of a torque converter must be carefully matched to the torque curve of the power source and the intended application. Changing the blade geometry of the stator and/or turbine will change the torque-stall characteristics, as well as the overall efficiency of the unit. Highway vehicles generally use low stall torque converters to limit heat production, and provide a more firm feeling to the vehicle's characteristics.

In a three-pass converter control system, the ability to rapidly and precisely control converter hydraulic system resistance through the converter discharge circuit controls an impeller clutch, which enables neutral idle, variable K-curve and lower load on the transmission oil pump. Without control of the converter discharge circuit it would not be possible to control the impeller clutch, which enables idle disconnect and variable K-curve.

In a conventional three-pass torque converter hydraulic control system, converter charge pressure and converter by-pass pressures are controlled by a valve or multiple valves in the main control. Converter charge pressure and by-pass pressure are either based on a percentage of regulated line pressure to prevent cover ballooning of the housing, or in the case of a closed piston, regulated maximum line pressure to optimize converter clutch torque capacity. Solenoids are used as the hydraulic control device. Depending on the precision of control, a pulse width modulated (PWM) or variable force solenoid (VFS) can be used. Converter discharge pressure is generally not separately controlled, but rather in a conventional converter is a dependent variable or a direct function of converter charge pressure and a restriction in the exit passage of the torque converter, stator, main control, case, and cooling circuit. Historically only converter charge pressure and by-pass pressure have been controlled. There has been little practical reason to precisely control and vary converter discharge resistance and pressure.

There is a need in the industry to control an impeller clutch in a torque converter during engine idle conditions in order to disconnect the engine and impeller and to vary the torque converter's K-curve.

SUMMARY OF THE INVENTION

A system for controlling a torque converter of an automatic transmission driven by a power source, the system including a torque converter an impeller, a turbine driveably connected to a transmission input and able to be driven hydrokinetically by the impeller, a stator, an impeller clutch for alternately engaging and disengaging a drive connection between the impeller and the power source, a source of converter charge pressure communicating with the impeller clutch, a source of converter discharge pressure communicating with the impeller clutch, a magnitude of differential force due to charge pressure and discharge pressure across the impeller clutch alternately producing operating multiple operating states of the impeller clutch, and an orifice having a variable fluid flow area for changing a magnitude of converter discharge pressure.

The invention provides precise hydraulic control of the converter discharge circuit allowing the impeller to be decoupled from the engine during idle, producing a variable converter K-curve and reduced oil pump flow demand.

Decoupling the impeller from the engine reduces load on the engine caused by the torque converter, thereby reducing fuel consumption during forward drive and reverse drive idle condition. This is accomplished with a single or multiple plate clutch in a torque transmission path between the impeller and a connection to the engine. The impeller clutch is controlled by a pressure differential between converter charge and discharge circuits, which makes precise hydraulic control of converter discharge pressure a requirement for idle disconnect.

The K-curve and effective K-curve, determined by slipping the impeller clutch, determine the torque converter load on the engine. Slipping the impeller clutch, thereby raising the effective K-curve, puts a lower load on the engine. For improved off-the-line performance, a raised effective K-curve is desirable. During normal driving at part throttle, a lower K-curve is advantageous for both fuel economy and performance. The ability, through precise hydraulic control of converter charge and discharge circuits, to slip the impeller relative to the engine raises the K-factor when performance is desired.

When the drive cycle demands a high percentage of available engine torque, either during vehicle launch or while towing a load, a raised or effective K-curve achieves better performance. The objective of a properly calibrated converter control system is to allow a controlled amount of impeller clutch slip at stall and low effective speed ratios. As efficiency becomes more important, controlled slip across the impeller clutch must be reduced to zero, such that the effective speed ratio equals speed ratio. The amount of controlled impeller slip must be characterized for partial to wide open throttle engine torque curves. The key is to characterize the effective K-curve to align peak available engine torque for a range of throttle positions from part-throttle to WOT with maximum converter torque multiplication, thus improving the attribute of wide open throttle performance and part-throttle performance feel. The ability to selectively raise the effective K-factor through slipping of the impeller clutch allows the K-factor defined by the internal torque converter hardware to be lower. Compared with a conventional torque converter, the ability to raise or lower the K-curve leads to a much more flexible system to balance vehicle performance with system efficiency.

Control of the converter discharge circuit resistance in certain driving modes and converter states lowers the load on the oil pump. Automatic transmissions are equipped with either a fixed or variable displacement oil pump to generate flow that is regulated, controlled and directed to friction elements such as clutches and bands, torque converter, lubrication and cooling circuit. The transmission oil pump is a power-take-off from the engine. If flow demand on the pump is decreased through reducing converter flow requirements, then the oil pump will operate more efficiently.

Whenever converter discharge resistance is raised above the downstream system resistance of the cooling circuit, then converter system flow demand is decreased, thus lowering the load on the pump by either redirecting unused flow back to the pump, in the case of a fixed displacement pump, or decreasing pump displacement, in the case of a variable displacement pump.

There are many instances where converter discharge resistance can be increased to lower the demand on the pump and increase efficiency. These include forward drive, reverse drive, neutral idle, vehicle deceleration, and when the converter clutch is locked. In a three-pass system in which converter discharge flow is directed to the cooling and lube circuit, the key calibration parameters that need to be characterized in order to increase hydraulic resistance are sump temperature, flow through the torque converter to maintain ATF cooling (lower flow requirement during idle and when the converter clutch is locked) and lube flow requirements. The flow requirements will need to be characterized for each converter system and where applicable the converter discharge resistance can be increased when the flow out of the converter is not required to maintain vital transmission function. However an enabler to lower the hydraulic demand on the oil pump is control of the converter discharge resistance.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a chart showing the relative magnitudes of converter bypass pressure, converter discharge pressure and converter charge pressure for various operating modes.

DESCRIPTION OF THE PREFERRED EMBODIMENT

Figure 1:
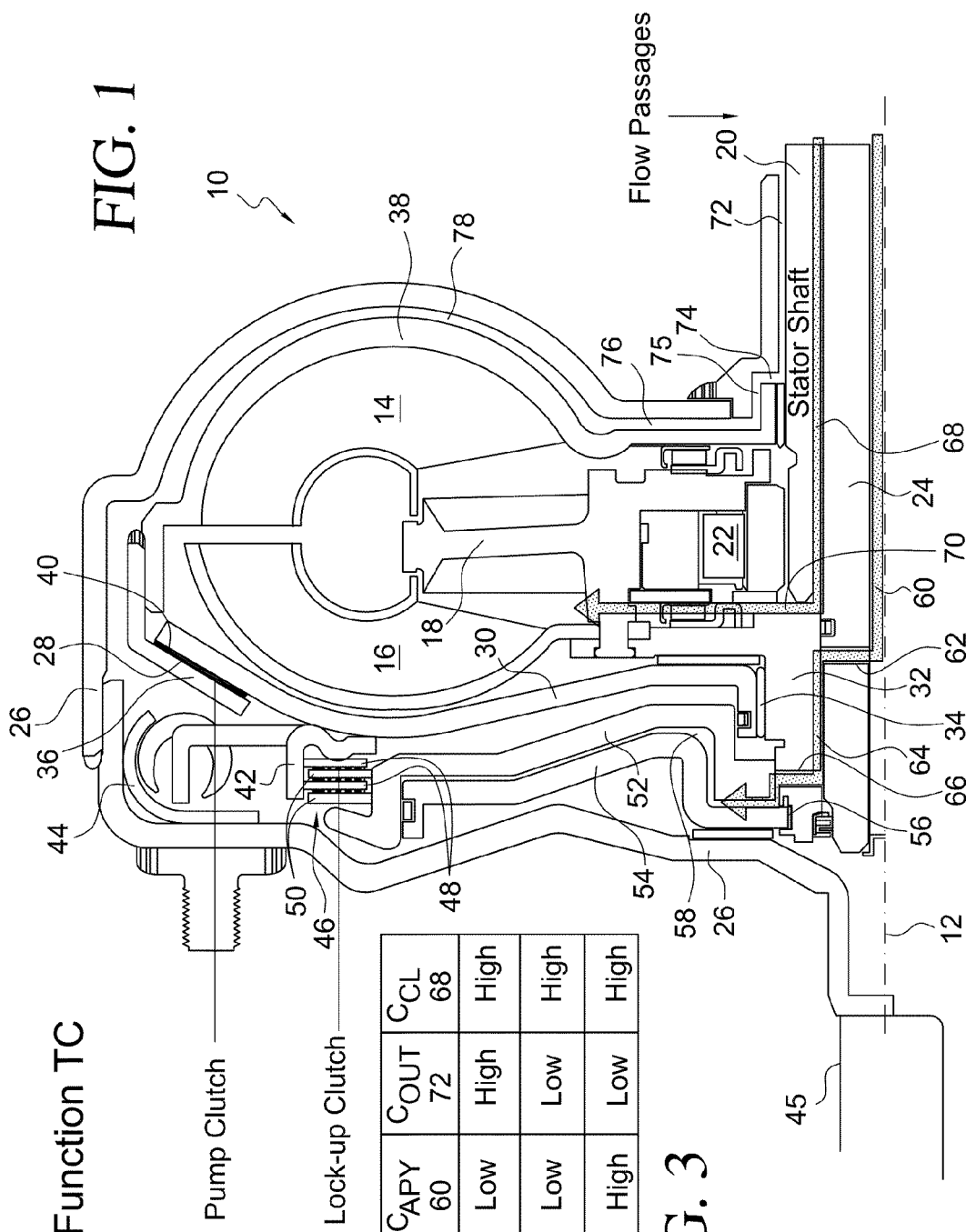
FIG. 1 is a cross section through a torque converter having a bypass clutch and impeller clutch.

Referring now to the drawings, there is illustrated in FIG. 1 a torque converter 10, which is arranged about a central axis 12 and includes a bladed impeller 14, a bladed turbine 16, and a bladed stator 18. The impeller, stator and turbine define a toroidal fluid flow circuit, whereby the impeller is hydrokinetically connected to the turbine.

The stator 18 is secured to, and supported for rotation on a stationary stator sleeve shaft 20. An overrunning brake 22 anchors the stator to shaft 20 to prevent rotation of the stator in a direction opposite the direction of rotation of the impeller, although free-wheeling motion in the direction of rotation of the impeller is permitted. The turbine 16 is secured to a rotating transmission input shaft 24, which transmits torque to the transmission gear box (not shown). A torque converter housing 26, surrounding the turbine, impeller and stator, is driveably connected to the crankshaft of an internal combustion engine (not shown) or another power source, such as an electric motor.

Located within a torque converter housing 26 is an impeller clutch 28 for alternately driveably connecting and releasing the impeller 14 and engine. Impeller clutch 28 includes a disc 30, supported for rotation on a turbine hub 32 by a bearing 34; a ring 36 secured to a shroud 38, which is attached to the periphery of each blade of the impeller 14; and friction material 40, located between ring 36 and disc 30. A ring 42, secured to disc 30, is connected also to a torsion damper 44, which resiliently connects the engine shaft 45 through the cover 26 to disc 30. The engine shaft 45 is secured to cover 26.

Also located within a torque converter housing 26 is a lockup clutch 46 for alternately driveably connecting and releasing the turbine 16 and engine through cover 26. Clutch 46 includes a first set of friction discs 48, splined at their outer circumference to a surface of ring 42, and a second set of friction discs 50, each splined at their inner circumference to piston 52, interleaved between consecutive first discs and secured to the turbine 16. Lockup clutch 46 is actuated by a piston 52, which is supported on turbine hub 32 and disc 30 and secured to hub 32 permitting axial displacement rightward and leftward along axis 12. A disc 54, secured by a spline 56 to turbine hub 32, is separated from piston 52 by a volume 58, which, when pressurized, moves piston 52 rightward forcing discs 50, 48 into mutual frictional contact and engaging clutch 46. When lockup clutch 46 is engaged, the engine shaft 45 and turbine 16 are mechanically interconnected and driveably connected to the transmission input shaft 24. When lockup clutch 46 is disengaged, the turbine 16 and engine shaft 45 are mechanically disconnected, and the turbine may be hydrokinetically driven by the impeller 14, provided impeller clutch 28 is fully engaged or slipping.

Fluid that causes lockup clutch 46 alternately to engage or apply and to disengage or release is supplied from a converter apply pressure circuit of the hydraulic system, whose magnitude is varied and regulated by the hydraulic control and actuation system of the transmission. Converter apply pressure $C_{APY}$ is transmitted from the converter apply pressure circuit of the hydraulic system to volume 58 through an axial fluid passage 60, radial passage 62 formed in input shaft 24, axial passage 64, and radial passage 66 formed in turbine hub 32, i.e., the converter bypass pressure source.

A source of converter charge pressure of the hydraulic system includes axial passage 68, which communicates through radial fluid passage 70 to the toroidal volume of the torque converter 10. Converter charge pressure $C_{CL}$ supplied from the converter charge pressure circuit of the hydraulic system through lines 68, 70 to the torque converter 10 develops a pressure force against the inner surface of impeller clutch disc 30 that is directed radially outward.

A converter discharge hydraulic circuit of the hydraulic system includes axial passage 72 and communicates with passages 74, 75 and 76. Converter discharge pressure $C_{ouT}$ in the converter discharge pressure circuit of the hydraulic system fills a volume 78 between impeller shroud 38 and cover 26 and develops a pressure force against the surface of ring 36 that is directed radially inward. The engaged, disengaged and slipping state of impeller clutch 28 is determined by the magnitude of the pressure differential across the impeller clutch 28, i.e., ($\Delta C_{CL} C_{OUT}$).

The impeller clutch 28 enables the decoupling of the impeller 14 from the engine shaft 45 during engine idle conditions. Decoupling of the impeller reduces load on the engine caused by the torque converter and fuel consumption in forward drive, reverse drive and neutral idle operation.

Figure 2:
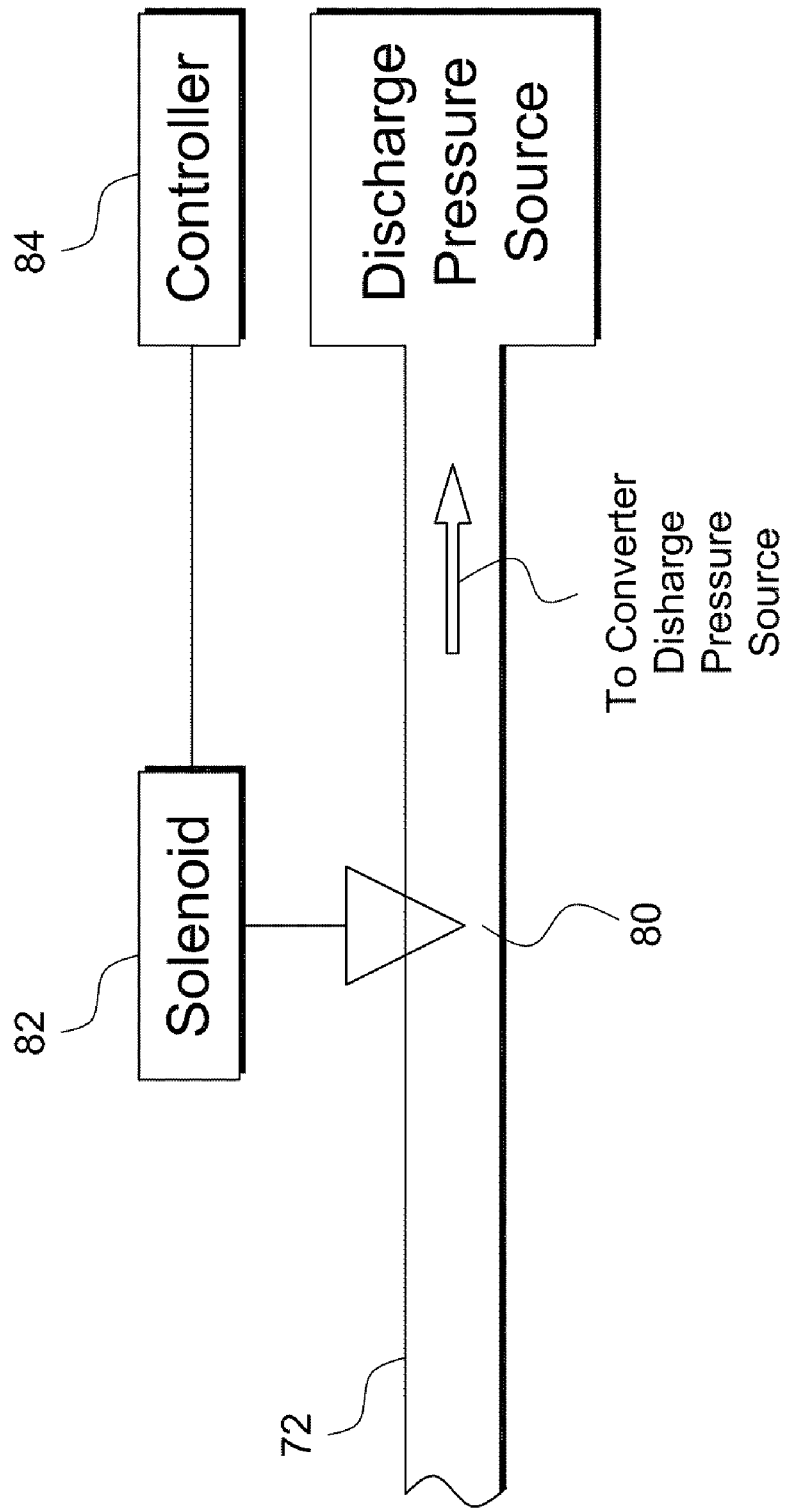
FIG. 2 is schematic diagram of orifice, solenoid and controller.

Referring to FIG. 2, the cross sectional area of an orifice 80, located in the converter discharge circuit 72, is changed by a variable force solenoid (VFS) 82, which responds to command signals from an electronic controller 84 in a transmission control unit. Solenoid 82 is supplied with a variable electric current such that the size of orifice 80 varies in response to the magnitude of the current. The controller 84 repetitively executes control algorithms, which control the lockup clutch 46, impeller clutch 28, pressure regulator valves, friction clutches and brakes in the transmission, etc, in response to signals representing operator control of the engine throttle position, wheel brakes, vehicle speed, temperatures, engine parameters and inferred road conditions. Controller 84 issues command signals in response to the results of executing the algorithms.

The control algorithms ensure proper operation of the transmission, compatible with engine operation and driver demands. For example, while operating in engine idle impeller disconnect mode, the cross sectional area of orifice 80 is such that a uniform pressure is produced across impeller clutch 28 allowing the impeller clutch 28 to disengage. During idle disconnect mode, the impeller clutch 28 is in the open state, i.e., $C_{OUT}$ pressure is equal to or greater than than $C_{CL}$ pressure. FIG. 3 shows for the neutral idle mode, the relative magnitudes of converter apply pressure $C_{APY}$, converter discharge pressure $C_{OUT}$, and converter clutch pressure $C_{CL}$.

The disengagement of the impeller clutch 28 decouples the engine 45 from the impeller 14. Since the impeller 14 is disconnected, there is little if any relative motion between the impeller and turbine reducing vortex flow and parasitic losses.

When the vehicle operator transitions from engine idle to drive away mode by releasing the brake pedal and depressing the throttle pedal, the impeller clutch 28 must immediately engage, i.e., either hard-lock the impeller 14 to the engine 45 or slip the impeller relative to the engine, thereby raising the effective K-curve of the torque converter. When the engine shaft 45 is coupled to the impeller 14, the torque converter 10 increases torque transmitted to output shaft 24 from the engine shaft 45. This torque amplification is accomplished by maintaining high converter charge pressure $C_{CL}$ while concurrently decreasing converter discharge pressure $C_{OUT}$ thereby increasing the pressure differential across impeller clutch 28.

The speed ratio of a torque converter equals turbine speed divided by impeller speed (Speed Ratio=N turbine/N impeller). The effective speed ratio of a torque converter equals turbine speed divided by engine speed (Speed Ratio=N turbine/N engine). If the impeller clutch 28 is hard-locked such that impeller speed equals engine speed, then the torque converter speed ratio equals the effective speed ratio. If the impeller clutch 28 is slipping such that impeller speed is less than engine speed (N impeller<N engine), the converter speed ratio is greater then the effective speed ratio.

The torque converter constant is equal to N engine/(T impeller)$^{1/2}$ and the effective torque converter constant is equal to N engine/(T engine)$^{1/2}$ When impeller clutch 28 is slipping, the effective K-curve is raised relative to the normal K-curve as defined by the torque converter geometry In order to avoid an undesirable state or a driver perceived hesitation, the hydraulic control system must be capable of generating a pressure delta sufficient to hold the combination of engine torque, inertia torque and a safety factor before engine torque reaches the impeller clutch. This is only possible with accurate and speedy control of the converter discharge circuit resistance with either a VFS or PWM.

In summary in a three-pass converter control system, the ability to rapidly and precisely control converter hydraulic system resistance through the converter discharge circuit enables neutral idle, variable K-curve and lower load on the transmission oil pump.

In accordance with the provisions of the patent statutes, the preferred embodiment has been described. However, it should be noted that the alternate embodiments can be practiced otherwise than as specifically illustrated and described.

What is claimed is:

1. A system for controlling a torque converter, comprising:
   a torque converter including an impeller, a turbine driveable by the impeller, and an impeller clutch releaseably connecting the impeller and a power source;
   a source of converter charge pressure communicating with the impeller clutch; and
   a source of converter discharge pressure producing controlled slip across the impeller clutch.

2. The system of claim 1
   a casing at least partially encloses the torque converter and is driveably connected to the power source.

3. The system of claim 1, wherein the impeller clutch includes:
   a first surface driveably connected to the impeller and communicating with the source of converter discharge pressure; and
   a second surface driveably connected to the power source and communicating with the source of converter charge pressure, a magnitude of differential pressure between the first surface and second surface alternately producing full engagement, full disengagement and slip across the impeller clutch.

4. The system of claim 1, wherein the impeller clutch includes:
   a first surface driveably connected to the impeller and communicating with the source of converter discharge pressure, which produces a first pressure force on the first surface; and
   a second surface driveably connected to the power source and communicating with the source of converter charge pressure, a magnitude of differential pressure force between the first surface and second surface alternately producing full engagement, full disengagement and slip across the impeller clutch.

5. The system of claim 1, further comprising:

an orifice having a variable fluid flow area for changing a magnitude of converter discharge pressure;

a solenoid for changing the flow area; and a controller electrically communicating with the solenoid and configured to adjust the flow area.

6. The system of claim 1, wherein:

the torque converter further includes a bypass clutch for alternately engaging and disengaging a drive connection between the turbine and the power source; and the system further includes a source of converter bypass pressure communicating with the bypass clutch.

7. A system for controlling a transmission driven by a power source, comprising:

a torque converter including an impeller, a turbine connected to a transmission input and an impeller clutch that produces a drive connection between the impeller and the power source;

a source of converter charge pressure communicating with the impeller clutch; and a source of variable converter discharge pressure producing controlled slip across the impeller clutch.

8. The system of claim 7, further comprising:

a cover enclosing the torque converter and driveably connected to the power source and impeller clutch, and defining a passage pressurized with said converter discharge pressure.

9. The system of claim 7, wherein the impeller clutch includes:

a first surface driveably connected to the impeller and communicating with the source of converter discharge pressure; and a second surface driveably connected to the power source and communicating with the source of converter charge pressure, a magnitude of differential pressure between the first surface and second surface alternately producing full engagement, full disengagement and slip across the impeller clutch.

10. The system of claim 7, wherein the impeller clutch includes:

a first surface driveably connected to the impeller and communicating with the source of converter discharge pressure, which produces a first pressure force on the first surface; and a second surface driveably connected to the power source and communicating with the source of converter charge pressure, a magnitude of differential pressure force between the first surface and second surface alternately producing full engagement, full disengagement and slip across of the impeller clutch.

11. The system of claim 7, further comprising:

an orifice having a variable fluid flow area for changing a magnitude of converter discharge pressure;

a solenoid for changing the flow area; and a controller electrically communicating with the solenoid and configured to adjust the flow area.

12. The system of claim 7, wherein:

the torque converter further includes a bypass clutch for alternately engaging and disengaging a drive connection between the turbine and the power source; and the system further includes a source of converter bypass pressure communicating with the bypass clutch.

13. A method for controlling a torque converter comprising the steps of:

(a) communicating a source of converter charge pressure to an impeller clutch that produces a drive connection between an impeller and a power source;

(b) communicating a source of variable converter discharge pressure to the impeller, clutch; and (c) using converter discharge pressure to control slip across the impeller clutch.

14. The method of claim 13 wherein step (c) further comprises the step of using an orifice having a variable fluid flow area for changing a magnitude of converter discharge pressure in the torque converter.

15. The method of claim 13 further comprising:

using a variable torque transmitting capacity of the impeller clutch to change a torque converter constant while accelerating a vehicle using the torque transmitted from the power source through the torque converter.

* * * * *